United States Patent [19]
Hoffman

[11] 3,715,459
[45] Feb. 6, 1973

[54] CABLE COUPLING COVERING AND MOISTURE BARRIER

[75] Inventor: Norman Edwin Hoffman, Harrisburg, Pa.

[73] Assignee: AMP Incorporated, Harrisburg, Pa.

[22] Filed: July 15, 1971

[21] Appl. No.: 162,808

[52] U.S. Cl. ............... 174/138 F, 174/71 R, 174/76, 174/92
[51] Int. Cl. ............................................. H02g 15/08
[58] Field of Search..174/71 R, 76, 91, 92, 93, 138 F

[56] References Cited

UNITED STATES PATENTS

| | | | |
|---|---|---|---|
| 2,923,762 | 2/1960 | Falkenstein | 174/92 |
| 2,967,795 | 1/1961 | Bollmeier et al. | 174/76 X |
| 3,138,657 | 6/1964 | Wengen | 174/92 |
| 3,255,302 | 6/1966 | Frank, Jr. | 174/92 X |

FOREIGN PATENTS OR APPLICATIONS

| | | | |
|---|---|---|---|
| 213,239 | 11/1956 | Australia | 174/93 |
| 1,068,782 | 11/1959 | Germany | 174/92 |
| 1,813,201 | 7/1970 | Germany | 174/92 |
| 984,179 | 2/1965 | Great Britain | 174/92 |

Primary Examiner—Laramie E. Askin
Attorney—William J. Keating et al., John R. Flanagan and Allan B. Osborne

[57] ABSTRACT

A two-piece hinged plastic covering forming an enclosure for a cable coupling. At least two cable ends protrude through the covering into the enclosure. The covering includes an interior channel encircling the coupling with additional portions of the channel diametrically encircling each moisture impervious sheath provided over each cable. An inlet is provided in the covering and in communication with the channel to allow injection of a flowable curable sealant which completely fills the channel to provide a continuous encircling band of moisture impervious material completely encircling the coupling and the moisture impervious sheaths on the protruding portions of the cables. The sealant may include a mild etchant such as acetic acid for partially softening and roughening the covering material and the moisture impervious sheaths of the protruding cable ends. The covering is of two-piece construction latched together by a rod inserted between aligned eye portions respectively connected to the cover portions. Accordingly, no specialized tooling is needed for latching the cover plate pieces together. Additionally, the sealant material may be introduced with a standard caulking gun, further eliminating the need for specialized tooling.

1 Claim, 3 Drawing Figures

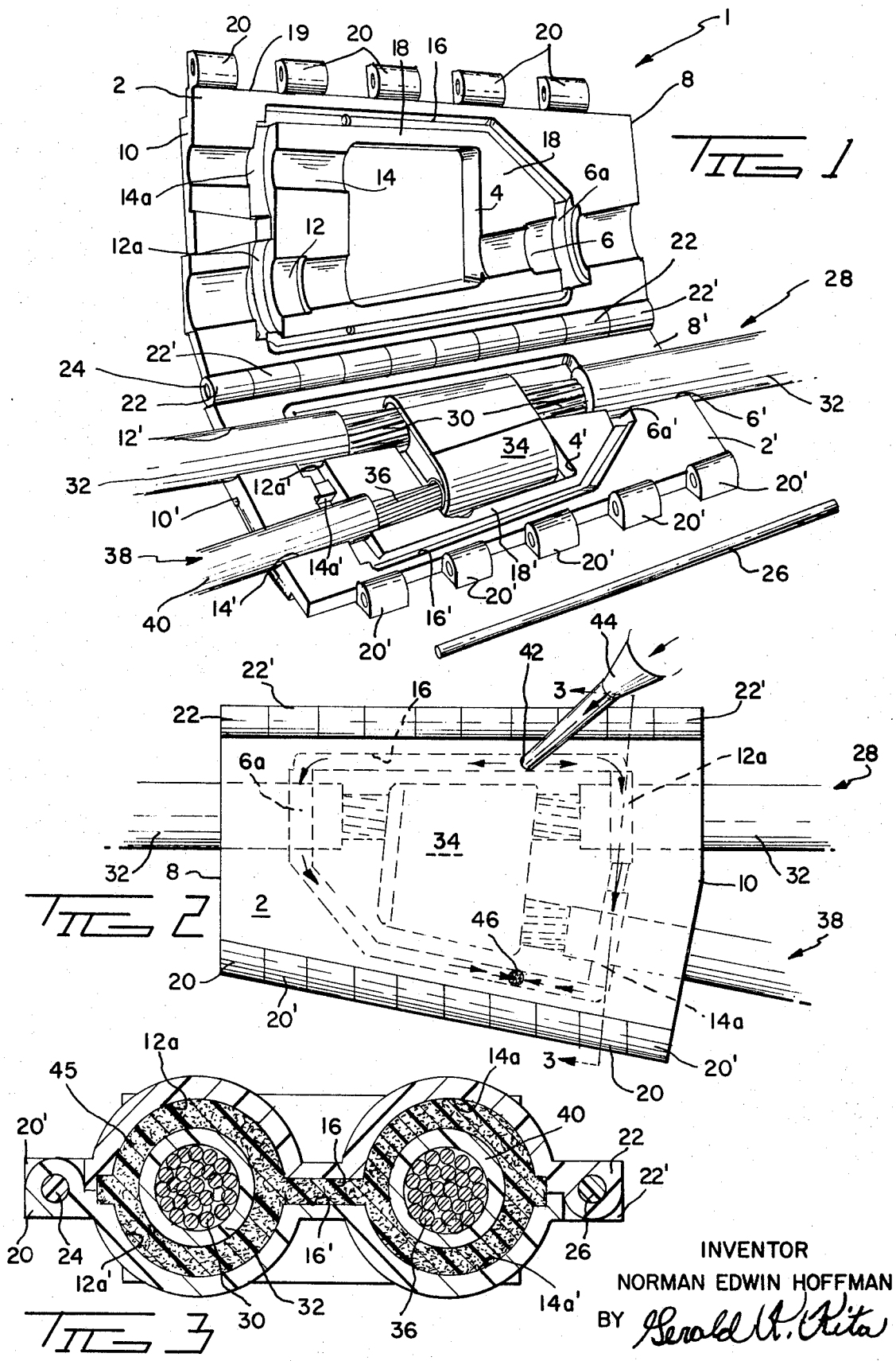

CABLE COUPLING COVERING AND MOISTURE BARRIER

The present invention relates to moisture impervious coverings for cable couplings, and more particularly, to a moisture impervious covering utilizing an injectable self-curing sealant utilizing a mild etchant to improve sealant characteristics.

A two-piece hinged plastic covering forms an enclosure for a cable coupling. At least two cable ends protrude through the covering into the enclosure and are attached by a coupling. The cables are covered with moisture impervious sheaths or coatings placed within an interior channel having portions encircling the coupling, with additional portions of the channel diametrically encircling each moisture impervious layer provided over each cable. An inlet is provided in the covering and in communication with the channel to allow injection of a flowable, curable sealant material which completely fills the channel to provide a continuous band of moisture impervious sealant material completely encircling the coupling and the moisture impervious sheaths on the protruding portions of the cables. To insure complete filling of the channel, sealant material is supplied to the channel until excess sealant material is observed at an outlet aperture in communication with the channel and remote from the inlet aperture. The sealant material may contain mild etchant such as acetic acid for partially softening and roughening the covering material and the moisture impervious layers of the protruding cable ends, thereby insuring adherence of sealant to the roughened surfaces. As an additional feature, the covering is of two-piece construction latched together by a rod inserted between aligned eye portions. Accordingly, no specialized tooling is needed for latching the cover plate pieces together. Additionally, the sealant material may be introduced with a standard caulking gun, further eliminating the need for specialized tooling.

It is therefor an object of the present invention to provide a moisture impervious covering for a cable coupling.

Another object of the present invention is to provide a cable coupling covering utilizing an injectable flowable sealant for rendering the covering moisture impervious.

A further object of the present invention is to provide a covering for a cable coupling which includes a channel encircling the coupling and adapted for receiving an injectable flowable self-curing sealant material.

Another object of the present invention is to provide a moisture impervious covering for a cable coupling which may be assembled and injected with a sealant material without a need for specialized tooling.

Another object of the present invention is to provide a moisture impervious covering for a cable coupling wherein a self-curing sealant is injected internally of the covering and a mild etchant is utilized to enhance bonding of the sealant to the covering and to moisture impervious sheaths provided on the coupled cables.

Other objects and many attendant advantages of the present invention will become apparent from perusal of the following detailed description taken in conjunction with the accompanying drawing, wherein:

FIG. 1 is a fragmentary perspective view of a cable coupling together with a two-piece covering and a rod for latchable insertion within aligned eye portions provided on respective portions of the covering;

FIG. 2 is a fragmentary plan view of a cable coupling provided thereover with the two-piece covering as shown in FIG. 1 and further illustrating the addition of sealant material; and FIG. 3 is an enlarged sectional view taken along the line 3—3 of FIG. 2.

With more particular reference to the drawings, there is shown in FIG. 1, a two-piece covering generally indicated at 1 including a cover portion 2 having a generally centrally located recess portion 4 having a first inlet recess 6 provided in one end portion 8 of the cover portion 2 and in communication with the recess portion 4. The opposed end portion 10 of the cover portion 2 includes a pair of inlet recesses 12 and 14 also in communication with the recess 4. The covering further includes a channel recess portion 16 which completely encircles the recess portion 4. The channel recess portion 16 is in spaced relationship from the recess 4 with a web 18 of the cover portion 2 providing a barrier and preventing communication between the recess channel portion 16 and the recess portion 4.

As shown in FIG. 1, taken in conjunction with FIG. 3, the channel portion 16 is in communication with each of the inlet recesses 6, 12 and 14 and includes generally arcuate channel recess portion 6a, 12a and 14a extending laterally through the respective recess portions 6, 12 and 14. In addition, the cover portion includes a side margin 19 connected between the end portion 8 and 10. A plurality of spaced aligned sleeves 20 or apertured eye portions protrude from the side margin 19. In similar fashion, a plurality of similar sleeves or apertured eye portions 22 are in spaced aligned relationship along a lateral margin extending between the end portions 8 and 10 and opposite the lateral margin 19.

A base portion 2' is also generally shown in FIG. 1 with the structural details thereof indicated by primed numeral designations. Corresponding structural portions of the cover portion 2 and the base portion 2' are given like numeral designations. For example, the recess portion 4 of the cover portion 2 corresponds to the recess portion 4' of the base portion 2'. The channel portion 16 of the cover portion 2 corresponds to the channel portion 16' of the base portion 2'. The aligned sleeve portions 22 of the cover portion are adapted to be aligned with and interposed between alternate ones of the sleeve portions 22', such that insertion of an elongated rod 24 hingeably joins the cover portion 2 to the base portion 2'. As shown in FIGS. 1 and 2, the cover portion 2 is adapted to be hingedly mounted to the base portion 2' as described and placed in overlying relationshiP therewith such that the sleeve portions 20 on the edge margin 19 are adapted to become aligned with and interposed between alternate ones of the sleeve portiOns 20' on the base portion 2'. An elongated rod 26 may then be manually inserted through the aligned sleeve portions 20 and 20' to permanently retain the cover portion 2 in overlying relationship with the base portion 2'. No specialized tooling is required to latch together the cover and base.

In operation, a first cable generally shown at 28 includes a plurality of tension strands 30 provided thereover with an encircling sheath or layer 32 of moisture impervious material such as polyethylene or neoprene. The cable 28 is placed within the inlet recesses 6' and 12' with the exposed strands 30 thereover being joined by a suitable coupling 34 to the exposed tension strands 36 of another cable 38. The cable 38 is placed within the inlet recess 14' together with its moisture impervious layer 40 thereof. As shown in FIG. 1, taken in conjunction with FIG. 3, the coupling 34, as well as the exposed strand portions 30 and 36, are placed generally within the recess portion 4' with the moisture impervious layer 32 of the cable 28 in registration within the recess portions 6' and 12', and with the moisture impervious layer 40 of the strands 36 being placed in registration within the recess portion 14'.

With the cover portion 2 in overlying relationship with the base portion 2' and joined thereto, by insertion of the rod 26 through the aligned sleeve portions 20 and 20', the recess portion 4 will cooperate with the recess portion 4' to provide a generally central enclosed recess within the covering 1. In addition, the recess portion 6 will communicate with the recess portion 6' and cooperate therewith to provide a first inlet portal encircling the moisture impervious layer 32. In addition, the inlet portion 12 will communicate with and cooperate with the inlet portion 12' to provide a second inlet portal encircling the moisture impervious layer 32. The recess portion 14 will cooperate with and communicate with the recess portion 14' to provide another inlet portal encircling the moisture impervious layer 40.

As shown in FIG. 2, the cover portion 2 includes a relatively reduced inlet aperture 42 in communication with the channel portion 16. The nozzle portion of a common caulking gun indicated diagrammatically at 44 is in communication with the aperture 42, for injecting a quantity of flowable sealant material 45 into the channel 16. As shown in FIG. 3, the channel formed by the channel portions 16 and 16' is completely filled with the sealant material. In addition, the channel portions 6a and 6a', as well as the channel portions 12a and 12a' and the channel portions 14a and 14a' are also filled with the moisture impervious sealant material to encircle and contact the layers 32 and 40 on the cables 28 and 38. Thus a continuous band of sealant material encircles the coupling 34 and the exposed strands 30 and 36 without a need for communication with the central recess portions 4 or 4'. In addition, the continuous band of sealant completely encircles and contacts the layers 32 and 40 further acting to isolate the coupling 34 from moisture in the atmosphere. The cover portion 2 and the base portion 2' may be made from a translucent or transparent moisture impervious material such as polyethylene, nylon or other suitable moisture impervious material. This insures that an operator is able to see through the covering that sufficient sealant is in the channel. As a further indication, as shown in FIG. 2, the cover portion 2 is provided with a relatively reduced exhaust aperture 46 in communication with the channel portion 16 at a location remote from the inlet aperture 42. Thus when the channel portion 16 is sufficiently filled with injected sealant material, the introduction of excess sealant material by the caulking gun will cause a quantity of the sealant material to leak out of the exhaust aperture 46, indicating that sufficient material has been injected into the channel portion 16. It is advantageous that the injected sealant material be self-curing under ambiant temperature conditions to prevent reflow thereof under variations in temperature and pressure conditions. It is further advantageous that the sealant material contain a mild etchant to partially soften or etch roughened surfaces in the covering 1 and the cable coverings 32 and 40, such that adherence thereto of the sealant material is improved. The etchant material may be added to the sealant material or, in the case of a commercially available room temperature vulcanizinG silicone sealant manufactured by Dow Chemical Company of New York City, acetic acid as the etching material is liberated upon curing of the sealant. In the use of such sealant, the curing agent is moisture itself, which may contact the sealant material through the inlet apertures 42 and 46.

Although specific embodiments and modifications of the present invention are illustrated and disclosed in detail, it is to be understood that the spirit and scope of the present invention are defined in the appended claims which are intended to cover additional modifications and embodiments which would be obvious to one skilled in the art, which claims are as follows:

What is claimed is:

1. A sealable covering for cable and cable couplings comprising:
   a. a base member and a cover member, each substantially the mirror image of the other, said members defining in cooperation,
      a centrally positioned recess for receiving one or more cables and a cable coupling,
      entry portals for receiving cable, said portals extending from the ends of said members to said recess, and a continuous channel for receiving a flowable sealant whereby said recess is sealed from without said covering, said channel spaced from and surrounding said recess and intersecting each of said entry portals;
   b. an inlet aperture extending through one of said members to said continuous channel, said inlet aperture for admitting sealant into said channel; and
   c. an exhaust aperture spaced from said inlet aperture and extending through one of said members to said continuous channel, said exhaust aperture for indicating fillup of said channel with sealant.

* * * * *